Nov. 20, 1956 T. J. MOTTER 2,771,378
METHOD OF PRODUCING MAR RESISTANT SURFACES
ON THERMOPLASTIC MATERIALS
Filed April 17, 1952
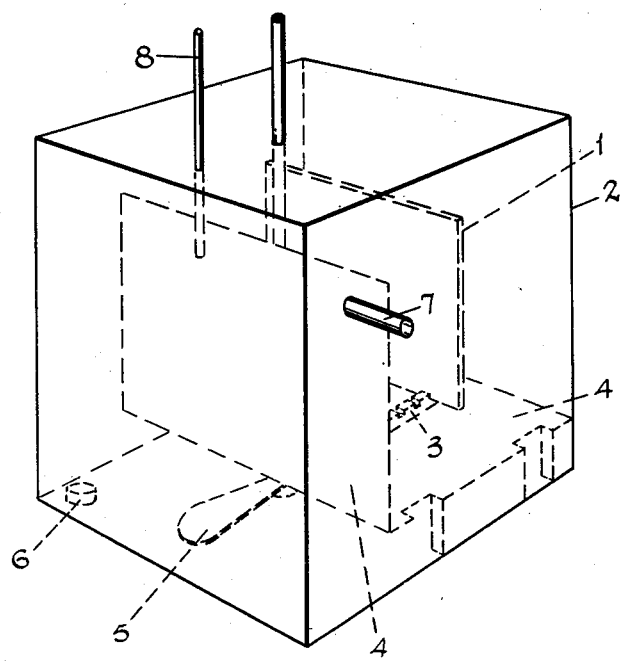
INVENTOR.
Theodore J. Motter
BY
Nobbe & Swope
ATTORNEYS

United States Patent Office 2,771,378
Patented Nov. 20, 1956

2,771,378

METHOD OF PRODUCING MAR RESISTANT SURFACES ON THERMOPLASTIC MATERIALS

Theodore J. Motter, Lemoyne, Ohio, assignor to Libbey-Owens-Ford Glass Company, Toledo, Ohio, a corporation of Ohio Application April 17, 1952, Serial No. 282,789

8 Claims. (Cl. 117—47)

This invention relates to a novel method of applying mar resistant surfaces to thermoplastic materials and to an improved thermoplastic article having mar resistant surfaces formed by said method.

It is well known that ordinary sheets of thermoplastic material, such as plasticized or unplasticized pure polymethylmethacrylate before being treated according to the method disclosed herein, have a very low resistance to marring. For example, sheets of pure polymethylmethacrylate were found to have a light loss of 13.82% when tested by the Taber Abraser. That is, this was the amount of light transmittance lost over the area of the sheets abraded by a CS10F wheel loaded with a 500 gram weight and revolved 100 times. In comparison, an ordinary sheet of plate glass was found to have a light loss of only 2.00% after 1000 revolutions.

With the advent of thermoplastic materials possessing sufficient clarity and strength to render them available in many respects for use as glass substitutes, considerable effort has been made to provide them with greater resistance to marring and the like. There are a number of thermoplastics which are known to have relatively hard surfaces. However, they have been found to be very difficult to form or shape and thus are impractical for many uses as glass substitutes.

It is therefore an object of this invention to provide a relatively simple method of applying a surface to cast, molded or formed thermoplastic materials such that the mar resistance thereof is greatly increased.

Another object of this invention is to provide an improved thermoplastic article having a surface layer which is stable as well as highly resitant to marring.

Other objects and advantages of this invention will become more apparent during the course of the following detailed description, when taken in connection with the accompaying drawing.

In the drawing, the single figure is a perspective view of an air-tight chamber used in performing the method of this invention.

This method involves the application of a mar resistant coating to polymethylmethacrylate, which is dry and yet contains some moisture in the surface layer thereof, by exposing it first to the vapors of methylmethacrylate or other suitable solvent and then to a mixture of vapors of the solvent and silicon tetrachloride.

It is to be understood that by means of minor adjustments in operating conditions suggestive to one skilled in the art, the method described may be used in applying similar surfaces to other thermoplastic materials. However, for a variety of reasons it is thought that the application of this invention in conection with polymethylmethacrylate would be most illustrative of the advantages to be derived from this invention. That is, polymethylmethacrylate is known to be readily formable and, therefore, polymethylmethacrylate with mar resistant surfaces would effectively serve the many purposes to which articles of this type are put, it being understood, of course, that said surfaces may also be applied according to this invention, to bent, curved, shaped, or formed sheets or articles as well as flat surfaced sheets or articles. Also, polymethylmethacrylate possesses the clarity of glass, will not be discolored by exposure to light, and is relatively inexpensive.

Sheets of pure as well as plasticized polymethylmethacrylate were found when treated in accordance with this invention to have a light loss, as tested by the Taber Abraser, of only 1.58% and 1.55%, respectively, after 100 revolutions. Further, a representative treated sheet was unaffected after being heated in an air oven at 50–55° C. for 12 days. Another appeared good after having been soaked in distilled water for 12 days at room temperature. Still another was crazed but still hard after soaking in distilled water over a steam bath for 42 hours. Thus, ont only was the mar resistance of the polymethylacrylate sheets found to be greatly improved but the coating applied to the sheets was quite stable. As well, the sheets appeared clear, bright and glass-like.

Specifically, the method by which the sheets of pure polymethylmethacrylate were treated is described hereinafter. For a reason to be explained, it is important that there be some moisture in the surface layer of the plastic sheet to be treated. Normally, when received the sheets of polymethylmethacrylate will inherently contain this moisture. However, it may be necessary to absorb some moisture into the interstices of the polymethylmethacrylate surface and this may be done by subjecting the sheets to a conditioned atmosphere of high relative humidity (80%–100%) for definite periods of time. Although the time element does not appear to be criitcal, 16 to 20 hours works well. Also, moisture may be absorbed by immersion for short periods of time. The sheet is thoroughly rinsed with methanol and blown dry. In this respect, it is not dried exhaustively but only surface dried such that the moisture aforementioned is not removed.

In practicing this method, the surface dried sheet 1, which in this instance was flat although, as aforementioned it may be shaped in a vareity of ways, was then placed in an air-tight chamber 2 and supported on edge inside the chamber on a rack 3 supported on an L-shaped baffle 4, under which a propeller 5 was rotated by any suitable means (not shown) for the purpose of agitating the air in the chamber. Preferably, the interior of the chamber is dried by a desiccant 6, such as $CaCl_2$ or $P_2O_5$, which is placed inside the chamber, inlets 7 and 8 thereto being closed and the enclosed air violently agitated for a period of about ten minutes.

A suitable solvent was then introduced into the chamber through inlet 7 and vaporized. It is believed that the very surface layer of the polymethylmethacrylate is swollen by the vapors of the solvent, permitting the subsequently added vapors of $SiCl_4$ to form a good bond to the resin. This is a critical step and requires rather strict control as the plastic is easily crazed. In general then, it is necessary to use a solvent which will not only dissolve the resin but also will not craze it under the strict controls contemplated by the method disclosed.

Although monomeric methylmethacrylate has been found best suited as a solvent for the purposes of this invention, satisfactory results have also been obtained with methylene dichloride. Also, it is contemplated that other solvents may be found satisfactory. However, the results aforenoted were obtained by adding to the specially prepared chamber 0.154 ml. of the freshly distilled methylmethacrylate for each liter of air space therein after the air in the chamber had been violently agitated as previously mentioned. Again, the air inside the chamber was agitated for about thirty minutes in order to vaporize the methylmethacrylate.

It was found desirable to stop the agitation noted above before the addition of SiCl₄. At this time, 1.466 ml. of technical grade SiCl₄ were added to the chamber through inlet 8 for each liter of air space therein and the air in the chamber agitated for a short period of about one minute. In this manner, the SiCl₄ is vaporized and the moist, softened sheet of polymethylmethacrylate may be exposed to the vapors of both the SiCl₄ and methylmethacrylate for periods up to 64 hours at room temperature, during which there is no circulation within the chamber.

It is thought that the SiCl₄ is hydrolyzed by the aforementioned moisture in the surface layer of the polymethylmethacrylate such that there is an embedding of some of the silicon atoms within the interstices of the resin whereby the silica film is anchored more securely. Excess chlorine atoms are believed to be hydrolyzed off as soon as the treated sheet is exposed to the atmosphere. The clear, thin film of silica left is apparently formed at the interface of the sheet between the SiCl₄ vapor and the water vapor.

The thickness of the silica film is largely determined by the moisture present at the time the SiCl₄ is admitted to the chamber. Up to a relative humidity of 60%, the greater the amount of water vapor, the thicker and harder the films formed. Thus, improved results may be possible by progressively adding water vapor to the chamber after exposure of the sheet to the SiCl₄.

This method may be duplicated with sheets of polymethylmethacrylate containing 5 and 10% dibutyl tartrate and 5% dibutyl tartrate with 5% methacrylic acid and the results with respect to pure methylmethacrylate obtained.

Various modifications of the method disclosed herein will suggest themselves to one skilled in the art and may be resorted to without departing from the scope of this invention. It is to be understood that the breadth of this invention is not to be limited to the specific details described in this method. Nor, as previously noted, is the method described or the article formed thereby to be limited to the application of mar resistant surfaces to polymethylmethacrylate. Necessary adjustments in the operating procedure described will be suggestive to one skilled in the art in applying similar surfaces to plastics other than polymethylmethacrylate.

I claim:

1. The method of applying a mar resistant surface to a thermoplastic material formed of polymethylmethacrylate which comprises exposing the surface of polymethylmethacrylate to vapors of a suitable volatile organic solvent which will not craze said surface and subsequently to vapors of the solvent and silicon tetrachloride.

2. The method of applying a mar resistant surface to a thermoplastic material formed of polymethylmethacrylate which comprises the steps of maintaining the surface of polymethylmethacrylate in a surface dried condition, softening said surface by exposing it to vapors of a suitable volatile organic solvent, and subsequently treating the conditioned polymethylmethacrylate with vapors of the solvent and silicon tetrachloride.

3. The method of applying a mar resistant surface to a thermoplastic material which comprises the steps of placing polymethylmethacrylate which contains a small amount of moisture in the surface layer thereof in an airtight chamber, adding methylmethacrylate to the chamber and vigorously agitating the air in the chamber so as to vaporize the methylmethacrylate, adding silicon tetrachloride to the chamber after the agitation has been stopped, repeating the agitation so as to vaporize the silicon tetrachloride, and exposing the polymethylmethacrylate to the mixture of said vapors.

4. A method of applying a mar resistant coating to a surface of a solid organic thermoplastic material which comprises subjecting said surface first to the vapors of a volatile organic solvent and then to the vapors of the solvent and silicon tetrachloride.

5. The method of hardening the surface of a solid organic thermoplastic material, which comprises the steps of softening the surface of the thermoplastic material with a substance selected from the group consisting of methyl methacrylate and methylene dichloride, and subsequently exposing said surface to the action of a mixture of the softening agent and silicon tetrachloride.

6. A solid methyl methacrylate polymer having a mar resistant surface, produced by softening said surface with a volatile organic solvent which will not craze said surface, and subsequently exposing said surface to the action of a mixture of the softening solvent and silicon tetrachloride.

7. A solid methyl methacrylate polymer having a mar resistant surface, produced by softening said surface with a solvent selected from the group consisting of methyl methacrylate monomer and methylene dichloride, and subsequently exposing said surface to the action of a mixture of the softening solvent and silicon tetrachloride.

8. A solid methyl methacrylate polymer having a mar resistant surface, produced by exposing said surface to the vapor of a solvent selected from the group consisting of methyl methacrylate monomer and methylene dichloride, and subsequently exposing said surface to the action of the vapors of a mixture of the solvent and silicon tetrachloride.

References Cited in the file of this patent

UNITED STATES PATENTS

| 2,404,357 | Bechtold | July 23, 1946 |
| 2,404,426 | Bechtold | July 23, 1946 |
| 2,412,470 | Norton | Dec. 10, 1946 |
| 2,431,873 | Kennelly | Dec. 2, 1947 |
| 2,440,711 | Bechtold | May 4, 1948 |